United States Patent
Appleyard

(10) Patent No.: US 6,725,964 B2
(45) Date of Patent: Apr. 27, 2004

(54) RELATING TO ELECTRICAL POWER ASSISTED STEERING

(75) Inventor: Michael Appleyard, Chorley (GB)

(73) Assignee: TRW LucasVarity Electric Steering Ltd., West Midlands (GB)

(*) Notice: Subject to any disclaimer, the term of this patent is extended or adjusted under 35 U.S.C. 154(b) by 0 days.

(21) Appl. No.: 10/225,927

(22) Filed: Aug. 22, 2002

(65) Prior Publication Data

US 2002/0189892 A1 Dec. 19, 2002

Related U.S. Application Data

(62) Division of application No. 09/719,615, filed as application No. PCT/GB99/01864 on Jun. 11, 1999, now Pat. No. 6,491,131.

(30) Foreign Application Priority Data

Jun. 16, 1998 (GB) .............................................. 9812844

(51) Int. Cl.⁷ ................................................. B62D 5/04
(52) U.S. Cl. ..................................... 180/444; 91/375 A
(58) Field of Search ............................... 180/443, 444, 180/446; 91/375 A

(56) References Cited

U.S. PATENT DOCUMENTS

| | | |
|---|---|---|
| 2,074,941 A | 12/1937 | Ricefield |
| 4,227,104 A | 10/1980 | Hamman |
| 5,072,650 A * | 12/1991 | Phillips ............. 91/375 A |
| 5,165,495 A | 11/1992 | Fujii |

FOREIGN PATENT DOCUMENTS

| | | |
|---|---|---|
| EP | 0270159 A2 | 6/1988 |
| EP | 0420131 A1 | 4/1991 |
| EP | 0748735 A2 | 12/1996 |
| GB | 1239717 | 1/1971 |
| GB | 1497736 | 1/1978 |
| GB | 2327652 | 2/1999 |
| JP | 62255618 | 11/1987 |
| JP | 01283041 | 11/1989 |
| JP | 06031171 | 3/1994 |
| JP | 07237551 | 9/1995 |
| JP | 8207792 | 8/1996 |
| WO | WO 99/11502 | 3/1999 |

* cited by examiner

Primary Examiner—Kevin Hurley
(74) Attorney, Agent, or Firm—Tarolli, Sundheim, Covell & Tummino L.L.P.

(57) ABSTRACT

An electric power assisted steering system is disclosed in which a motor (1) is adapted to provide, an assistance torque to an output shaft (12) through a worm gear (13) and wheel gear assembly (11) and a biasing means (14) is provided which biases the shaft carrying the worm gear (13) into engagement with the shaft carrying the wheel gear (11). The biasing means (14) may comprise a spring member provided between the gearbox housing and the bearing (9) supporting the free end of the worm gear shift, or a torsion spring adapted to act upon the bearing assembly.

3 Claims, 5 Drawing Sheets

RELATING TO ELECTRICAL POWER ASSISTED STEERING

This application is a Div of Ser. No. 09/719,615 filed on Dec. 14, 2000 filed as PCT 6099/01864 filed Jun. 11, 1999, U.S. Pat. No. 6,491,131.

This invention relates to improvement in gear assemblies, and in particular to electrical power assisted steering assemblies which incorporate a worm and wheel gear assembly for transferring torque from an electric motor to a steering column or output shaft operatively connected thereto.

It is known to provide a power steering system for a vehicle comprising an electric motor having a stator and a rotor, an input shaft operatively connected to the rotor and adapted to rotate therewith, an output shaft associated with a steering column, and a gearbox adapted to transfer torque from the input shaft to the output shaft in response to a measure of torque in the output shaft produced by a torque sensor. The motor is typically operated to apply an increasing torque to the output shaft as the measured torque increases, thus applying an assistance torque which helps to steer the vehicle.

In a simple arrangement, the input shaft defines a worm gear, and the output shaft is provided with a wheel gear which is adapted to mesh with the worm gear. Whilst such a system is relatively effective, there exists a problem with noise and vibration due to incorrect meshing between the worm and gear wheel. This incorrect meshing may arise due to manufacturing tolerances, thermal changes in dimensions, distortion due to torsional loads and wear during service.

According to a first aspect, the invention provides an electric power assisted steering system comprising a housing, an electric motor fixed relative to the housing having a stator and a rotor, an input shaft operatively connected to the rotor, an output shaft operatively connected to a steering column, and a torque sensor adapted to produce an output signal indicative of the torque in the output shaft, the motor being adapted to apply a torque to the output shaft dependent upon the output signal from the torque sensor through a worm gear provided on the input shaft which is adapted to mesh with a wheel gear on the output shaft, the steering system being characterised by further comprising a first bearing means which supports the input shaft relative to the housing at its end distal from the motor and a resilient biasing means adapted to act upon the first bearing means to bias the input shaft towards the wheel gear.

Preferably, the input shaft is biased in a tilting movement which is centred at a second bearing means which supports the input shaft relative to the housing at its end adjacent to the motor.

The biasing means may be adapted to apply a sufficient biasing force to the first bearing means to maintain a fully meshed engagement between the teeth of the worm gear and the teeth of the wheel gear over a predetermined range of torque values carried by the wheel gear. This helps to prevent gear rattle when driving straight ahead or on rough roads by ensuring both sides of the engaging teeth on the worm and wheel are in contact at substantially all times over this range of torques. Because the arrangement increases quiescent friction in the gearbox it is important to maintain control of the force applied by the biasing means over the full range of the input shaft that is required. Therefore the biasing means must have a low spring rate.

The provision of the biasing means allows a controlled biasing force to be applied whilst permitting sufficient tilting movement of the input shaft to compensate for changes in dimensions due to manufacturing variations and temperature changes etc. The maximum torque value up to which the fully meshed engagement is effective is carefully chosen (by compromise) to avoid excessive friction.

The biasing means may comprise a resilient spring of any type adapted to act between a portion of the housing and the first bearing means.

In some configurations, it is preferred that the resilient spring comprises a leaf spring which may be attached to the housing at a first end and act upon the first bearing means at its second end. This may engage the first bearing means at the opposite side of the input shaft to the wheel gear so as to bias the worm into contact with the wheel gear.

The leaf spring may be provided outside of the housing and the second end of the leaf spring may pass through an opening in the housing to engage with the first bearing means. The second end of the leaf spring may carry a seal which seals with the opening through which it passes.

The input shaft may be directly connected to the motor rotor. It may extend continuously through the rotor.

The input shaft may be operatively connected to the rotor through a flexible coupling which allows the worm to tilt without movement of the rotor.

The flexible coupling may comprise a resilient element, for example of rubber. The motor rotor may be adapted to apply a drive force to the resilient element through one or more circumferentially spaced radially extending surfaces of the resilient element. The resilient element may in turn be adapted to apply a drive force to the input shaft through one or more other circumferentially spaced radially extending surfaces of the element. The element may comprise a spider shape having a multiple of arms presenting a number of radially extending, circumferentially spaced drive surfaces.

Where the input shaft is connected to the motor rotor by a flexible coupling, a first compression means may be provided between the housing and the first bearing means at the end of the input shaft distal from the motor which applies a compressive force onto the input shaft to bias it towards the motor rotor. It may comprise a coil spring. Its function is to prevent noise and vibration due to axial free play in the second bearing means. In its compressed state, there should be free space between adjacent coils in order to avoid frictional resistance to tees tilting motion of the input shaft.

A second compression means (such as a coil spring) may also be provided between the end of the input shaft adjacent the motor rotor and the motor rotor. This may be provided in a cup formed on an end of the input shaft whilst a pin extending about the rotational axis of the motor rotor and forming a part of the rotor projects into the cup to engage the spring.

Thus, whilst the first compression means biases the second bearing means through the flexible coupling, the second compression means biases the rotor directly through the pin. There must be a difference between the forces provided respectively by the first and second compression means which is sufficient to bias the second bearing means in the direction of the input shaft axis by the desired amount.

In an alternative, the biasing means may comprise an annular O-ring provided between the first bearing means and the housing. The O-ring may be of rubber, and may contact an outer circumference of the first bearing means and a portion of the housing.

The first bearing means may therefore move relative to the housing against a resistant force applied by the O-ring as at least part of the O-ring is compressed. In such an arrangement, the wheeled gear or the worm gear may deliberately be made slightly oversize relative to the dimensions which are calculated according to the distance between their respective shaft axes. This ensures the O-ring is always under a small amount of residual compression.

In an alternative to an O-ring, the resilient biasing means may comprise a resilient element which is accommodated between the first bearing means and the housing, such as a rubber spacer block. The element may be disposed between the first bearing means and the housing, opposite to the side of the input shaft which engages the gear wheel. The biasing means may act in compression or tension.

The second bearing means may comprise a ball bearing which is adapted to prevent radial and axial movement of the input shaft relative to the housing whilst permitting tilting movement of the input shaft against the bias force provided by the biasing means.

The second bearing means may be selected to comprise a high tolerance ball bearing assembly which is adapted by virtue of the shape of the groove in which the balls are located to substantially prevent any radial displacement of the input shaft relative to the housing as it passes through the second bearing whilst permitting the input shaft to pivot about a point on its axis which passes through a point in the plane of the second bearing means.

In a preferred arrangement, the housing defines a first portion and a second portion, the first portion comprising a housing for the input shaft having at least one pair of opposed walls, and having an opening in each wall into which the first and second bearing means are respectively provided, and the second portion comprising a housing for at least part of the output shaft having at least one pair of opposed walls, an opening being provided in each wall for receiving one or more bearings adapted to secure the output shaft relative to the housing. The output shaft is preferably mounted orthogonal to the input shaft and substantially prevented from moving radially relative to the housing.

A plastic lining portion may be provided around a circumferential outer face of the first bearing means which prevents contact between the first bearing means and the housing at excessive displacement. This helps to eliminate vibration noise due to metal—metal contact between the first bearing means and the housing.

The first opening defined in the first portion of the housing (which receives the first bearing means) may comprise an elongated slot through which the input shaft passes having semicircular end portions and a central pair of parallel sides. The spacing between the parallel sides may be substantially the same as the outer diameter of the firs, bearing means. The radius of the semicircular end portions of the slot may be substantially the same as the outer radius of the first bearing means. Thus, the first bearing means may be adapted to move axially along the slot but may be prevented from moving radially perpendicular to the slot.

The first opening of the first portion may comprise an annular bore having an inner surface with a diameter greater than the diameter of the first bearing means. The outer surface of the first bearing means may thus be spaced from the inner wall. The O-ring element forming the biasing means may be accommodated in this space.

A groove may be provided around a circumference of the inner wall which locates the O-ring in a predetermined position relative to the wall, the depth of the groove being less then the radial thickness of the O-ring element. In this case, the first bearing means may be displaced from its rest position against the biasing force provided by the O-ring through a distance equal to the difference between the O-ring radial thickness and the depth of the groove. Thereafter, the first bearing means is prevented from further radial displacement within the opening as it engages the inner wall of the first opening.

In a yet further alternative arrangement, the biasing means; may comprise a torsion bar having a first end acting upon the first bearing means and a second end fixed relative to a portion of the housing so that the torsion bar applies a biasing force against the first bearing means.

The torsion bar may comprise a substantially U-shaped elongate rod having a terminal end portion on a first end of the roll which is bent through an angle of approximately ninety degrees relative to the remaining part of the first end and relative to the centre portion of the rod to engage with a portion of the first bearing means. Preferably, the terminal end portion acts directly on an outer surface of the first bearing means opposed to the wheel gear of the output shaft by pas sing through an opening channel in the housing extending radially away from the inner wall of the first opening of the first portion of the housing.

The central portion of the torsion bar may be secured to a portion of the housing through one or more clamps or shackles.

The second end of the torsion bar may rest upon an end face of a threaded bolt which engages with the housing. Rotation of the bolt within the threaded bore displaces the second end of the torsion bar relative to the housing. As the first end is engaged with the first bearing means this acts to increase or decrease torsion in the bar in a known manner, in turn to alter the biasing force applied to the first bearing means (i.e. for use when setting up).

In a preferred arrangement, a terminal portion of the second end of the torsion bar is bent through approximately ninety degrees relative to the remaining part of the second end portion and engages within a recess in the end face of the bolt. This provides a positive location for the second end portion.

In yet a further alternative arrangement, where space in the vehicle permits, the biasing means may comprise a coil spring leaving its axis substantially perpendicular to that of the wormshaft. The coil spring could be installed in a hole in the housing. A first end of the spring could apply force to the outer race of the first bearing means via a formed end of the spring or via a separate component placed between the spring and the first bearing means. A closure plug or plate at the end of the hole distal from the bearing means would provide a support to the coil spring and a means of sealing.

In a most preferred arrangement, the terminal portion of the second end of the torsion bar engages with a recess in the housing. This renders the arrangement non-adjustable and tamper proof which is preferable for production versions.

In a refinement, where the biasing means comprises an O-ring seal acting between the first bearing means and the housing, the centre axis of the O-ring may be offset relative to the central axis of the input shaft. This provides a different relationship between biasing force and displacement of the bearing means compared to the case where the central axes of the O-ring and shaft coincide. It is preferred that the axis of the O-ring is closer to the wheel gear than that of the input shaft where is passes through the first bearing means.

To further refine the relationship between the biasing force and displacement of the first bearing means, the shape of the O-ring groove (where provided) relative to the cross-section of the O-ring may be chosen so that the compressed portion of the O-ring just completely fills the groove at a predetermined displacement corresponding to a predetermined biasing force, whereafter the rate of increase of biasing force with full displacement is significantly greater than the rate of increase of biasing force with displacement at displacements below the predetermined displacement. When the O-ring is in its normal position corresponding to zero torque on the gear wheel, the O-ring may therefore only partially fill the groove at this point.

According to a second aspect, the invention provides an electric power assisted steering system comprising a housing, an electric motor fixed relative to the housing having a stator and a rotor, and input shaft operatively connected to the rotor, an output shaft operatively connected to a steering column, and a torque sensor adapted to produce an output signal indicative of the torque in the output shaft, the motor being adapted to apply a torque to the output shaft dependent upon the output signal from the torque sensor through a worm gear provided on the input shaft which is adapted to mesh with a wheel gear on the output shaft, the steering system being characterised in that the input shaft is operatively connected to the motor rotor by a flexible coupling.

By providing a flexible coupling, it is possible for the input shaft to tilt relative to the motor rotor. This enables the position of the worm relative to the wheel to be adjusted to remove gear rattle without having to move the rotor.

Preferably, the flexible coupling comprises a resilient element. It may be a rubber element.

The element may have a plurality of substantially radially extending drive faces. One or more of the drive faces may co-operate with one or more radial drive faces defined on the rotor. One or more of the drive faces may co-operate with drive faces defined on the input shaft. The motor rotor thus can apply torque to the input shaft through these faces.

Preferably, the element comprises a spider having a plurality of radially extending arms defining the drive surfaces.

The input shaft may have a cup formed on its end adjacent the motor rotor. A pin located along the axis of rotation of the rotor may be adapted to be received within the cup. The flexible coupling may be provided between an end face of the cup and the rotor, perhaps around the pin.

The cup may be adapted to receive a first resilient biasing element such as a spring which acts between the end of the pin and the bast of the cup to bias the rotor away from the input shaft.

A second compression means may be provided which is adapted to bias the input shaft towards the rotor. This may comprise a spring located between the housing and a bearing means which supports the input shaft.

There will now be described three examples of the present invention by way of example only. Reference is made to the accompanying drawings which include like reference numerals for like parts, of which:

FIG. 1 is a cut-away view of part of an electrical power-assisted steering system of the present invention for use in a vehicle.

Figure 1:
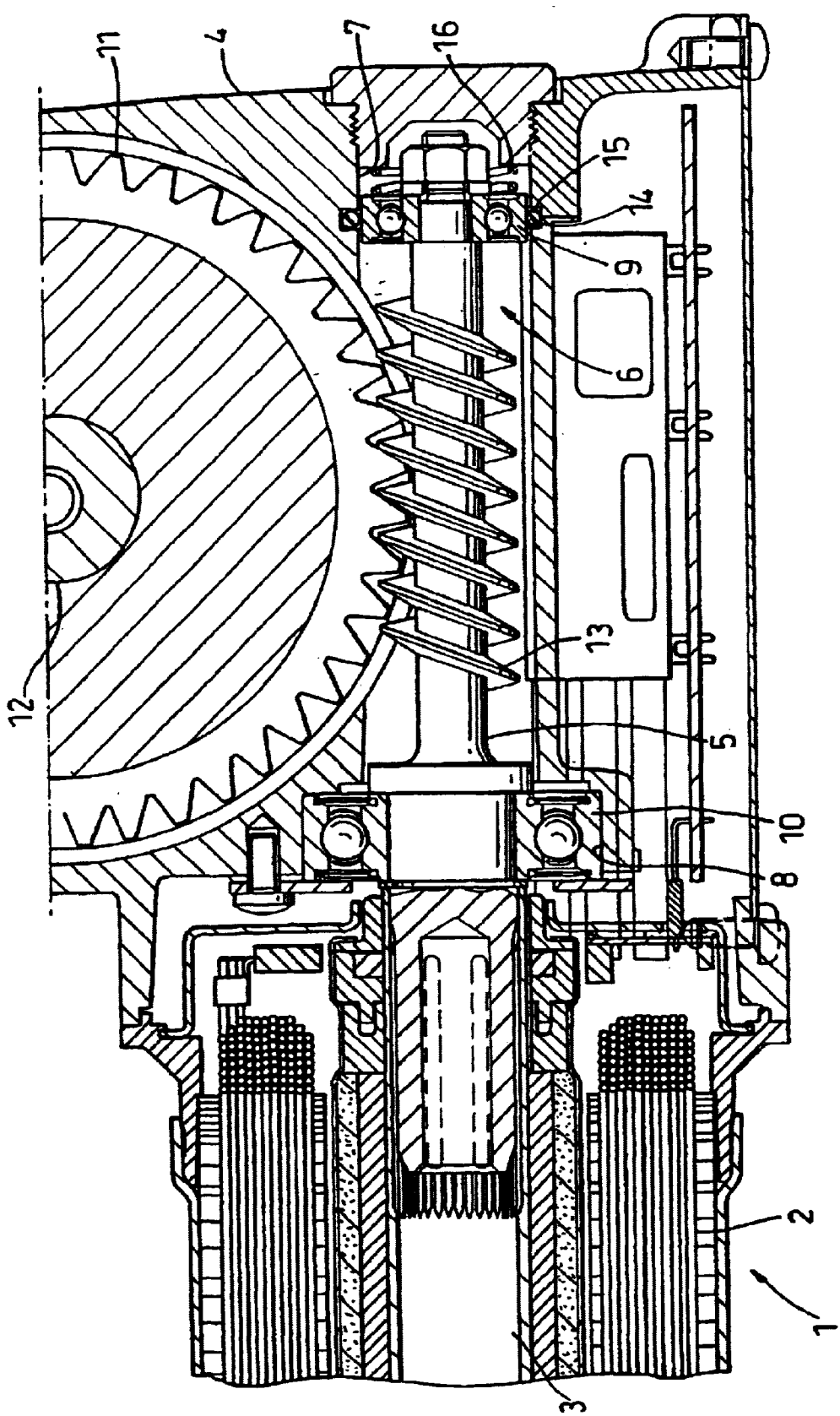
FIG. 1 is a cut-away partial view of a first embodiment of an electrical power assisted steering system which incorporates the present invention.

A motor 1 for applying assistance torque to an output shaft 12 operatively connected to a steering column shaft comprises a stator 2 and a rotor 3. The motor is mounted onto a side of a housing 4. One end of an input shaft 5 which is splined to an end of the rotor extends through an opening 8 into an inner cavity 6 of the housing. The other end of the input shaft passes through an opening 7 on an opposite side of the housing to the opening 8, and a first bearing means 9 and second bearing means 10 located in the openings 7 and opening 8 respectively support the input shaft relative to the housing.

The input shaft 5 carries a worm gear 13 between the two bearing means which is adapted to engage with a toothed wheel 11 provided on the output shaft 12 where it passes through the housing. Bearings (not shown) support the output shaft 12 relative to the housing 4 orthogonal to the axis of the input shaft 5 so that the worm gear and wheel gear are meshed.

In use, an output from a torque sensor (not shown) adapted to measure the torque in the output shaft 12 (or a steering shaft operatively connected thereto) is passed to an electronic control unit (ECU) in turn to produce a motor drive signal which controls the torque produced by the motor 1. The motor 1 then transfers torque through the motor rotor 3 to the input shaft 5 and onto the output shaft 12 to provide assistance to aid a driver of the vehicle.

Each of the bearing means 9, 10 comprises a ball bearing or roller bearing cartridge having an inner bearing race which co-operates with the input shaft and an outer bearing race spaced around the inner race, bearings being provided therebetween. Any well known bearing assembly can be used subject to meeting the requirements for tolerance and load bearing set out by the designer.

The second bearing means 10 is secured to the housing 4 and acts as a pivot about which the input shaft 5 may tilt. It prevents substantially all radial movement of the shaft 5 as it passes through the bearing 10.

The first bearing means 9 is spaced from the housing 4 by a resilient biasing means 14 adapted to bias the input shaft 5 towards the gear wheel 12 of the output shaft 11.

The second (and larger) bearing means 10 therefore reacts tangential forces being applied to the gear wheel by the worm, as well as radial forces (i.e. at right angles to the axis of the worm) due to the helix angle and pressure angle of the teeth.

The first bearing assembly 9 is constrained axially relative to the housing 4 (as described hereinafter) but is free to move radially against the biasing force applied by the biasing means 14.

The biasing means 14 acts to bias the worm into mesh with the gearwheel via an elastic medium and to allow it to adopt a fully meshed condition (i.e. where there is no clearance between the flanks on either sides of the engaging worm and gearwheel teeth) for the range of gearwheel size and position variations (due to manufacturing tolerances), temperatures and states of tooth wear. As shown in FIG. 1, the biasing means comprises an O-ring which locates in a groove 15 having a square cross section.

It is required to maintain this fully meshed condition for a range of torque values, measured at the gear wheel, (for example up to 4N-m in one application) in order to prevent gear rattle when driving around the straight ahead on rough roads. A force of 20N needs to be applied to the worm, radially with respect to the gearwheel in order to maintain full meshing at 4 N-m gearwheel torque. When a higher torque is applied, then the worm will move away from the gearwheel and, clearance will occur at the sides of the teeth which are not transmitting the torque. The maximum torque rating of the gear system shown in FIG. 1 is 42 N-m.

Experiments have shown that the range of dimensional backlash variation due to tolerances, temperature and wear that may arise, if a biasing means was not incorporated, is typically around 0.150 mm. To compensate for this, a range of radial displacements of the worm, relative to the gearwheel, is needed which is approximately 2× the backlash variation (because of the 14 degree pressure angle); i.e. 0.300 mm total (or +/−0.150 mm from the nominal worm axis position). This range of displacements is provided by allowing the wormshaft to pivot around the larger ball bearing, nominally moving in a vertical plane, and to bias the movement towards the gearwheel by means of the 3 mm wide O-ring acting on the outer race of the smaller ball bearing, In the particular design shown in FIG. 1 the ratio of the lengths from the engaging centre of the worm to the centres of the respective bearings means that a force of 20×48[48+ 38.5] N (=11N) should be applied by the O-ring. This should ideally be maintained over a range of displacements, from the nominal worm axis position, of +/−0.270 mm (=+/− 0.150×[48 +38.5)/48] mm). However, this is not practical because the force must change with movement in the case of such a simple elastic medium. As a compromise, the invention achieves a force range of approx. 17 to 27 N over the 0.540 mm (i.e. +/−0.270 mm) total displacement range. This is achieved by positioning the centre of the O-ring groove to be offset relative to the nominal position of the worm axis. The amount of that offset will depend on the Force vs. Displacement characteristic of the O-ring, which will act as a non-linear spring whose rate will increase as the worm is forced further away from the gearwheel. Once the limit of the above working displacement range is exceeded, in the direction away from the gearwheel, then the resistance of the O-ring should rise very rapidly to prevent excessive wormshaft movement at high torques.

An absolute limit of travel is provided (for example 0.500 mm from the nominal axis) by virtue of the fact the bore in the housing for the 22 mm diameter bearing is machined to 23 mm. To avoid metal-to-metal impact noise, the force of the O-ring at 0.500 mm off centre displacement of the small bearing may be chosen to be at least 150 N. Thins will require a very fast rising spring rate between 0.300 and 0.500 mm displacement. This can be achieved by tailoring the precise shape of the O-ring groove, in relation to the diameter of the O-ring's cross section, such that the O-ring material just fills the groove at the exact point at which the spring rate is required to rise steeply. The hardness of the rubber is another parameter that can be optimised.

Note that it is important to limit the meshing force which occurs at the lower torques because it induces a significant amount of quiescent friction into the operation of the gearbox and this is detrimental form efficiency and good road feel. A meshing force of 20 N will create 0.4 N of friction as measured at the gearwheel. The maximum acceptable is typically around 0.5 N.

To enable it to act as a pivot centre for the wormshaft, at least over the small angular displacements involved (+/− 0.18 degrees), the larger bearing can be specified as a "C3" clearance grade (i.e. with the maximum standard clearance choice). This will allow the bearing to run with the required misalignment without excessive friction and wear. To prevent it from rattling due to the sporadic gearbox torque reversals that occur when driving straight ahead on rough roads, it bearing may be axially pre-loaded at 90N. The pre-load can be applied via the shaft by preloading the smaller bearing's outer race by means of a compressed coil spring 16.

The connection between the wormshaft 5 and the motor rotor 3 is via clearance spline engagement in which a small leaf spring is used to laterally load the male spline relative to the female spline and remove any torsional free play in the motor drive. This arrangement permits a small amount of bending compliance between the wormshaft and the motor rotor and hence allows the desired displacement of the wormshaft.

Figure 2:
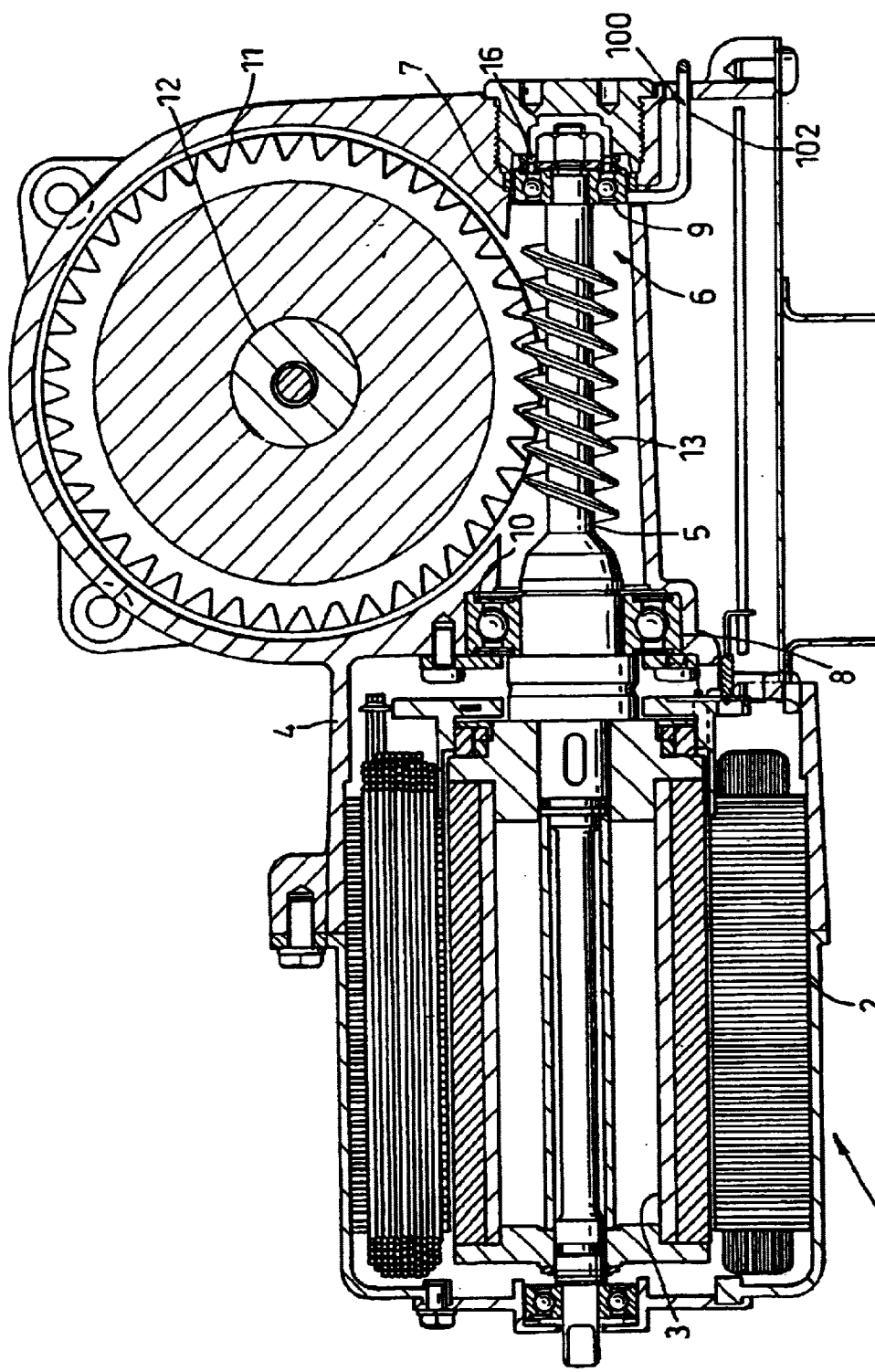
FIG. 2 is a view of a second embodiment of an electrical power-assisted steering system incorporating the present invention.
Figures 3, 3A:
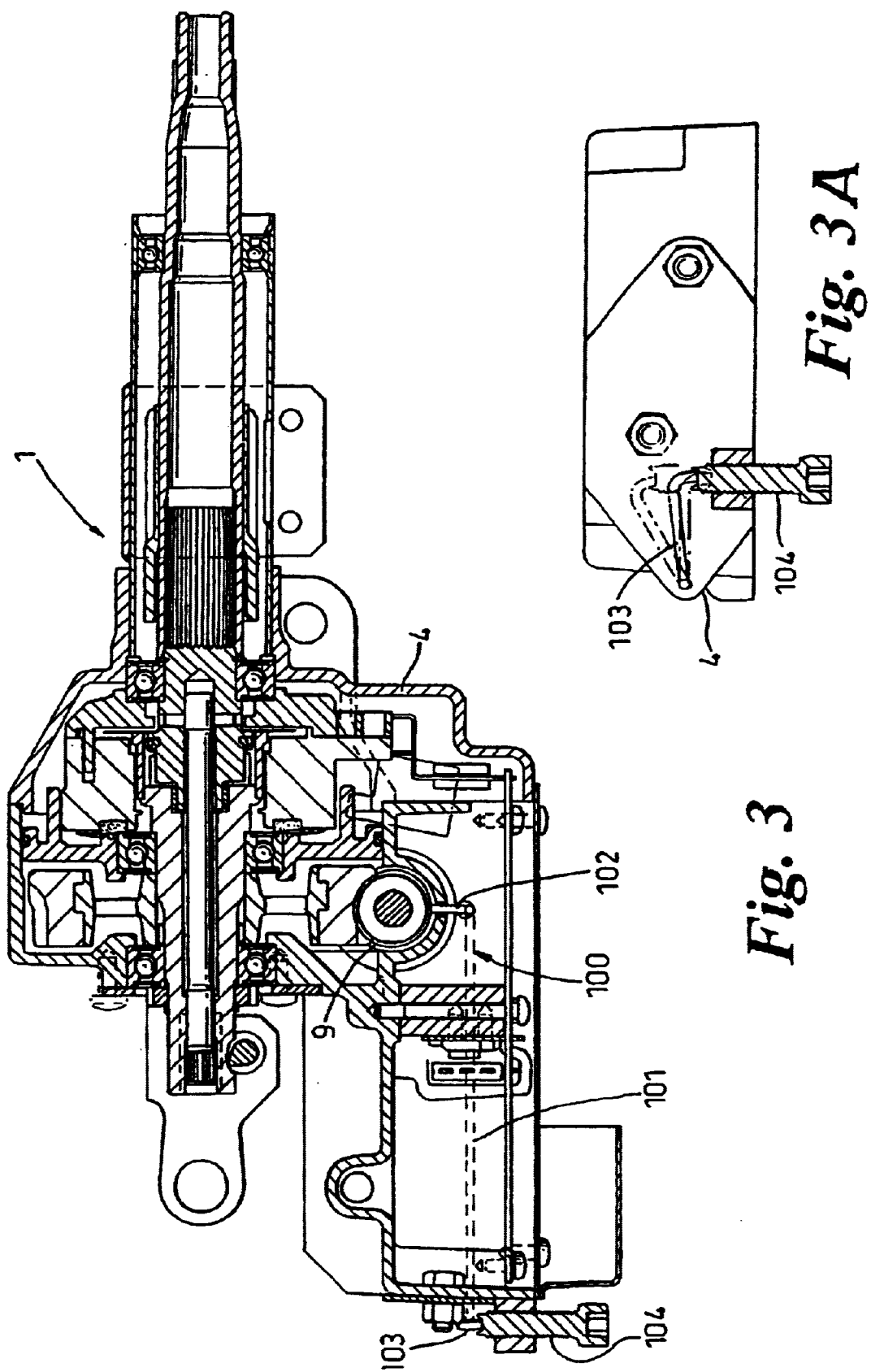
FIG. 3 is an alternate view of the system of FIG. 2 showing the connection between the torsion bar and a threaded bolt which is fastened to the housing.

An alternate embodiment is shown in FIGS. 2 and 3 and where possible, like reference numerals have been used to those provided on FIG. 1 as many components are identical.

The second embodiment differs from the first embodiment in so far as the biasing means comprises a torsion bar 100 acting upon an outer surface of the first bearing means instead of an O-ring seal.

The torsion bar 100 comprises an elongate bar bent into an elongated U-shape. Each end of the bar is further bent over though approximately ninety degrees.

The central portion 101 of the bar 100 is clamped onto a portion of the housing 4 through a bush which allows the bar to rotate about its axis. One end 102 of the bar acts upon the bearing means whilst the other 103 acts upon a bolt 104 threadably engaged with the housing 4. Rotation of the bolt 104 displaces the associated end of the bar, inducing torsion in the bar as the other end is prevented from moving by the bearing means. Thus, the biasing force can be adjusted by rotating the bolt.

Of course, a bolt is not essential, and many other ways of varying the biasing force can be employed. For example, shims may be inserted between the end of the torsion bar and either the bearing means or the housing. Alternative spring types are also envisaged within the scope of the invention.

The skilled man will therefore understand that the present invention lies, in at least one aspect, in the provision of a biasing means (which biases the input shaft towards the output shaft with a desired Displacement Biasing Force relationship so as to at least partially prevent gear rattle.

Figure 4:
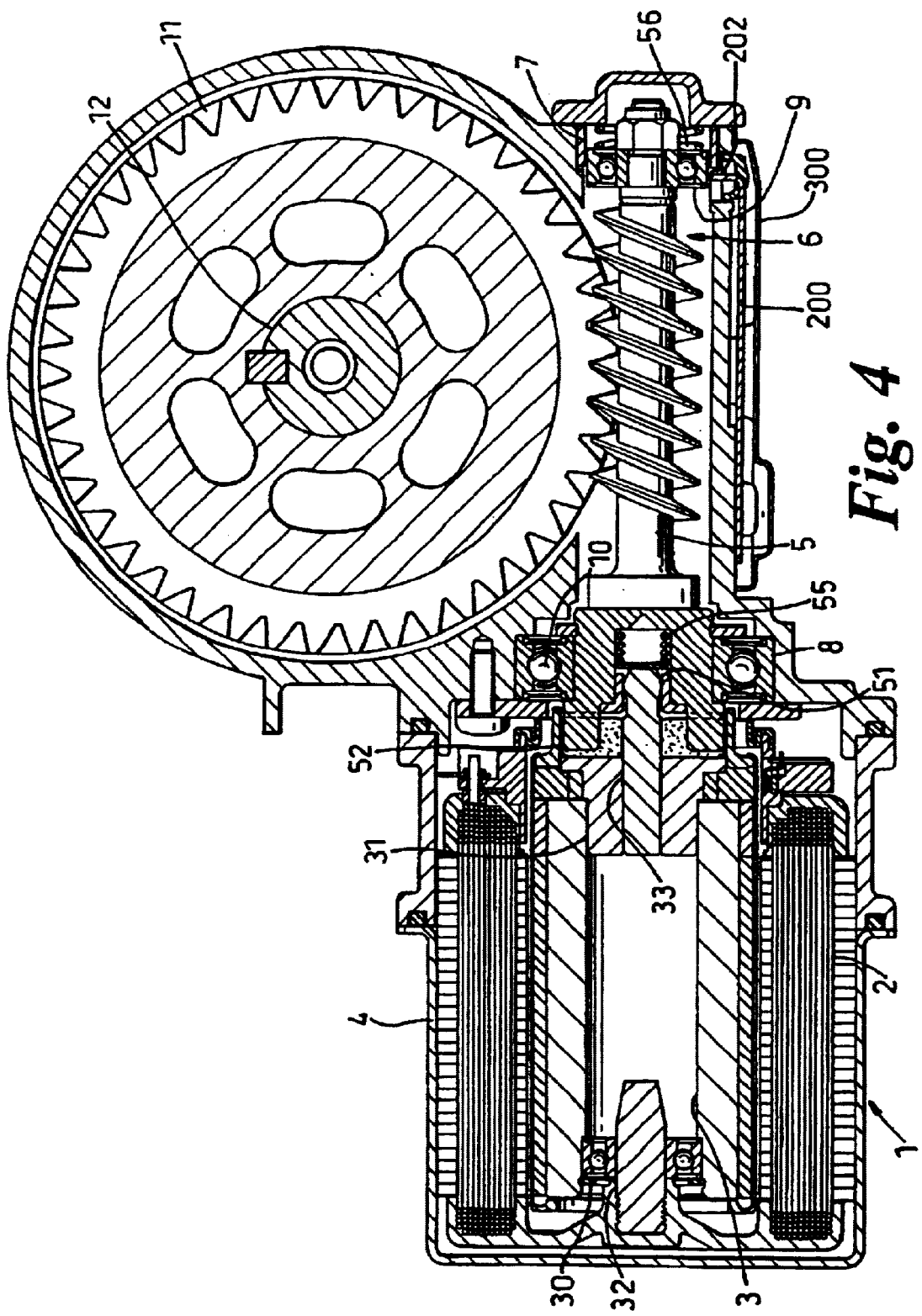
FIG. 4 is a view of a third embodiment of an electrical power-assisted steering system incorporating the present invention.

A third embodiment of an electrical power assisted steering system of the present invention is illustrated in FIG. 4.

This system differs from the previous two systems in that the worm gear is provided on an input shaft 5 which is isolated from the motor rotor 3 by a flexible coupling. It is also biased against the wheel gear 11 using a leaf spring 200 arranged to act upon the first bearing means 9 supporting the end of the shaft 5 opposite the motor.

The motor rotor 3 is cylindrical and is supported at each end by a respective hub 30, 31. A first hub 30 comprises a supporting frame with a bearing located on its axis of rotation. The bearing is a sliding fit over a centred stud 32 which forms a part of the motor housing 4 and which is located on the central axis of rotation of the rotor. The stud thus passes through the bearing to provide support for the rotor at the end of the motor opposite to the gearbox.

The second hub 31 comprises a radial supporting frame and an integral centrally located pin 33. The pin 33 projects outwardly from the rotor 3 towards the gearbox and is accommodated in a cup 51 formed on the end of the input shaft 5 to ensure approximate axial alignment of the rotor and the input shaft 5.

Between the second hub 31 and the cup 51 is a flexible coupling 52 comprising a rubber spider with eight identical, circumferentially spaced arms 53 defining sixteen radial drive surfaces 54.

Figure 6:
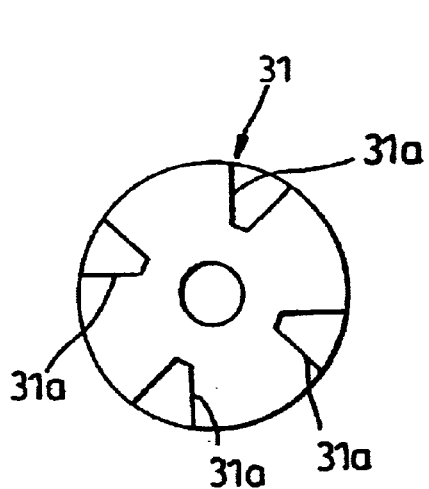
FIG. 6 is a detail of the flexible spider element.
Figure 6:
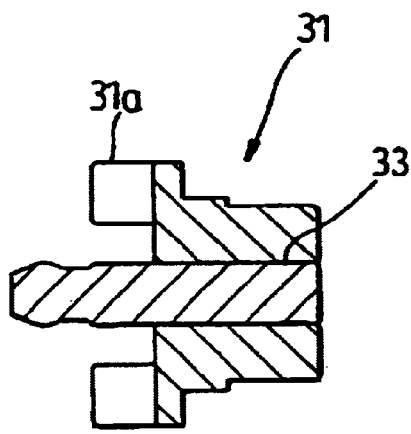

As can be seen in FIG. 6, the second hub 31 has four drive teeth or dogs 31a projecting towards the gearbox which engage between corresponding arms of the flexible spider. The cup 51 on the worm gear shaft is similarly provided with four teeth or dogs which extend axially towards the rotor and engage the remaining drive surfaces between the arms of the spider. Thus, drive from the motor rotor is coupled to the worm shaft through the spider.

Figure 5:
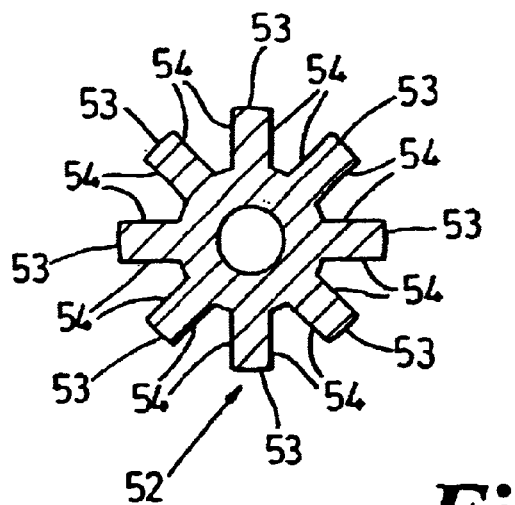
FIG. 5 is a detail of the second support hub for the motor rotor.
Figure 5:
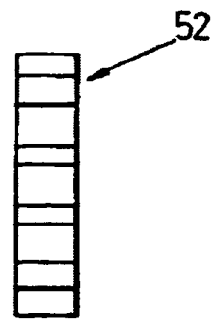
Figure 7:
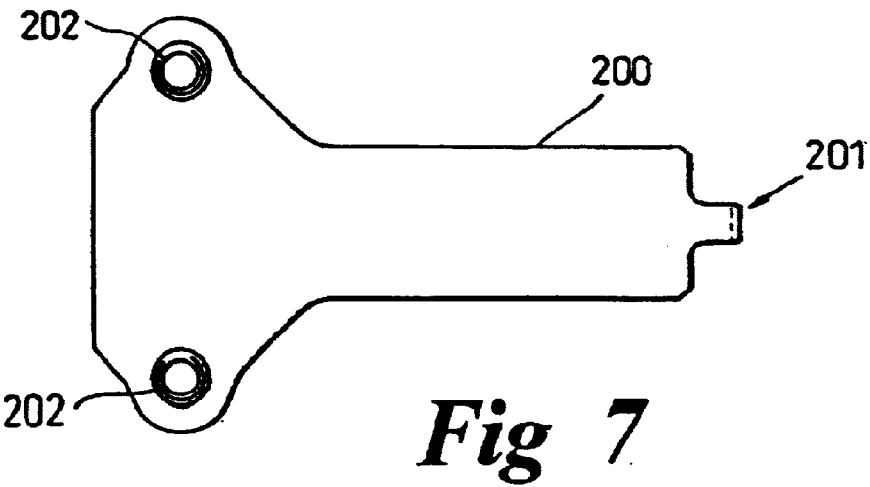
FIG. 7 shows in plan the leaf spring element.

Providing the flexible coupling, which can be seen in more detail in FIGS. 5 and 7 of the accompanying drawings allows the input shaft 5 to move without the need for corresponding movement of the motor rotor 3, enhancing the operating life of the motor.

A small coil spring 55 is provided within the cup which acts through a spacer onto the end of the pin of the second hub to bias the motor rotor away from the gearbox. A second spring 56 is provided between the gearbox housing and the first bearing means to bias the input shaft 5 towards the rotor.

The leaf spring 200 can be seen in more detail in FIG. 7 of the accompanying drawings. It comprises a substantially planar resilient element that is bolted 202 at one end onto the motor housing with the plane of the spring parallel to the axis of the input shaft.

The free end 201 of the leaf spring 200 is bent through ninety degrees and passes through an orifice in the housing to engage the first bearing means 9. This applies a force to the input shaft directed towards the wheel gear. An over moulded seal on the end 201 of the leaf spring co-operates with the walls of the orifice to seal the orifice. In addition, a cover plate 300 is provided which prevents access to the leaf spring unless the cover is removed.

The first bearing means supporting the free end of the worm gear shaft is located within a plastics guide that is an interference fit within the housing. The guide is oversize by 0.76 mm in respect of movement of the first bearing means radially towards and away from the wheel gear but is a close tolerance fit in the orthogonal (horizontal) direction to restrain movement of the bearing in that direction. The guide thus allows only one degree of freedom of movement of the first bearing means.

What is claimed is:

1. An electric power assisted steering system comprising a housing, an electric motor fixed relative to said housing having a stator and a rotor, and input shaft operatively connected to said rotor, an output shaft operatively connected to a steering column, and a torque sensor adapted to produce an output signal indicative of said torque in said output shaft, said motor being adapted to apply a torque to said output shaft dependent upon the output signal from said torque sensor through a worm gear provided on said input shaft which is adapted to mesh with a wheel gear on said output shaft, wherein said input shaft is operatively connected to said motor rotor by a flexible coupling, and wherein said flexible coupling comprises a plurality of radially extending arms defining a plurality of substantially radially extending drive faces, at least one of the drive faces co-operating with at least one said drive faces co-operating with drive faces defined on said input shaft.

2. An electric power assisted steering system according to claim 1, wherein said input shaft has a cup formed on its end adjacent said motor rotor and a pin located along its axis of rotation of said rotor is adapted to be received within said cup.

3. An electric power assisted steering system comprising a housing, an electric motor fixed relative to said housing having a stator and a rotor, an input shaft operatively connected to said rotor, an output shaft operatively connected to a steering column, and a torque sensor adapted to produce an output signal indicative of said torque in said output shaft, said motor being adapted to apply a torque to said output shaft dependent upon the output signal from said torque sensor through a worm gear provided on said input shaft which is adapted to mesh with a wheel gear on said output shaft, wherein said input shaft is operatively connected to said motor by a flexible coupling and wherein said flexible coupling comprises a plurality of radially extending arms.

* * * * *

(12) EX PARTE REEXAMINATION CERTIFICATE (10005th)
United States Patent
Appleyard

(10) Number: US 6,725,964 C1
(45) Certificate Issued: Jan. 10, 2014

(54) ELECTRICAL POWER ASSISTED STEERING

(75) Inventor: Michael Appleyard, Chorley (GB)

(73) Assignee: TRW LucasVarity Electric Steering Ltd., Wednesbury, West Midland (GB)

Reexamination Request:
No. 90/012,767, Jan. 18, 2013

Reexamination Certificate for:
Patent No.: 6,725,964
Issued: Apr. 27, 2004
Appl. No.: 10/225,927
Filed: Aug. 22, 2002

Related U.S. Application Data

(62) Division of application No. 09/719,615, filed as application No. PCT/GB99/01864 on Jun. 11, 1999, now Pat. No. 6,491,131.

(30) Foreign Application Priority Data

Jun. 16, 1998 (GB) ........................................ 9812844

(51) Int. Cl.
*B62D 5/04* (2006.01)

(52) U.S. Cl.
USPC .......................................... 180/444; 91/375 A

(58) Field of Classification Search
None
See application file for complete search history.

(56) References Cited

To view the complete listing of prior art documents cited during the proceeding for Reexamination Control Number 90/012,767, please refer to the USPTO's public Patent Application Information Retrieval (PAIR) system under the Display References tab.

*Primary Examiner* — Linh M. Nguyen

(57) ABSTRACT

An electric power assisted steering system is disclosed in which a motor (1) is adapted to provide, an assistance torque to an output shaft (12) through a worm gear (13) and wheel gear assembly (11) and a biasing means (14) is provided which biases the shaft carrying the worm gear (13) into engagement with the shaft carrying the wheel gear (11). The biasing means (14) may comprise a spring member provided between the gearbox housing and the bearing (9) supporting the free end of the worm gear shift, or a torsion spring adapted to act upon the bearing assembly.

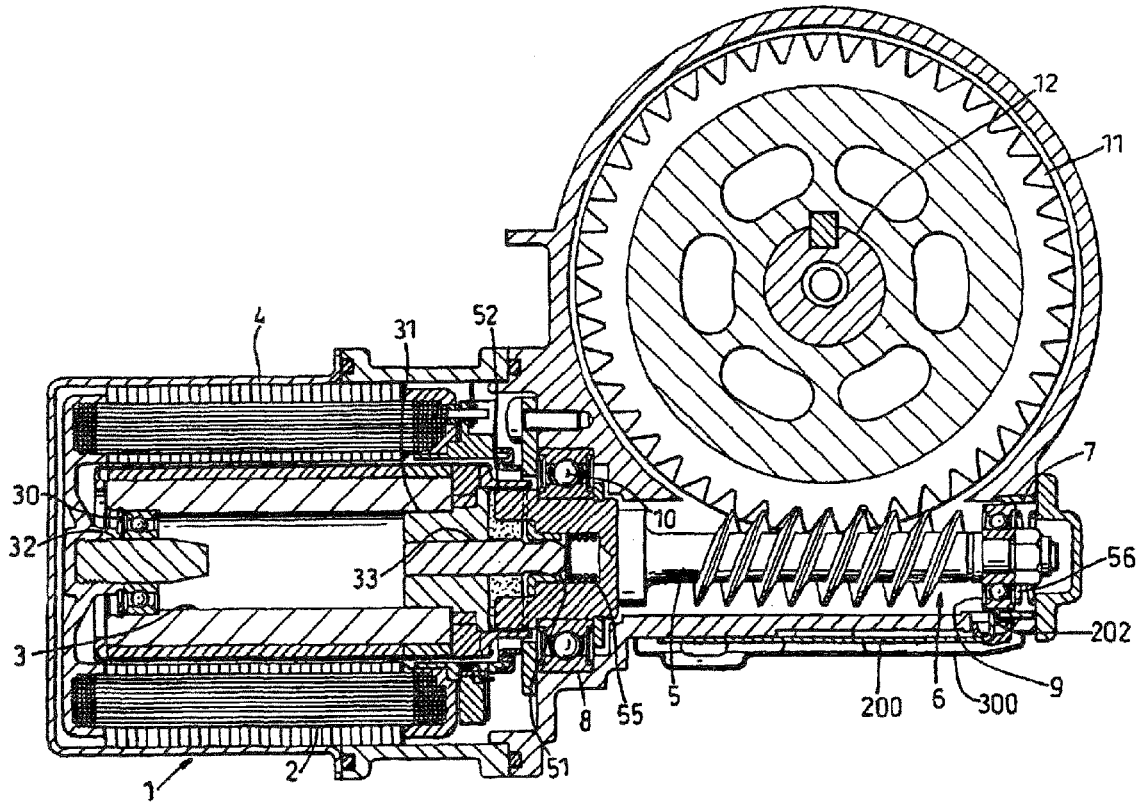

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is cancelled.

Claim 3 is determined to be patentable as amended.

New claims 4-10 are added and determined to be patentable.

Claim 2 was not reexamined.

3. An electric power assisted steering system comprising a housing, an electric motor fixed relative to said housing having a stator and a rotor, an input shaft operatively connected to said rotor, an output shaft operatively connected to a steering column, and a torque sensor adapted to produce an output signal indicative of said torque in said output shaft, said motor being adapted to apply a torque to said output shaft dependent upon the output signal from said torque sensor through a worm gear provided on said input shaft which is adapted to mesh with a wheel gear on said output shaft, wherein said input shaft is operatively connected to said motor by a flexible coupling, *said flexible coupling having a flexible member, said flexible member transmitting torque between said motor rotor and said input shaft,* and wherein said flexible coupling comprises a plurality of radially extending arms.

*4. An electric power assisted steering system according to claim 3, wherein each of said plurality of radially extending arms is flexible.*

*5. An electric power assisted steering system according to claim 4, wherein each of said plurality of radially extending arms transmits torque between said motor rotor and said input shaft.*

*6. An electric power assisted steering system according to claim 3, wherein said flexible coupling is configured to permit tilting of said input shaft relative to said motor rotor.*

*7. An electric power assisted steering system comprising a housing, an electric motor fixed relative to said housing having a stator and a rotor, and input shaft operatively connected to said rotor, an output shaft operatively connected to a steering column, and a torque sensor adapted to produce an output signal indicative of said torque in said output shaft, said motor being adapted to apply a torque to said output shaft dependent upon the output signal from said torque sensor through a worm gear provided on said input shaft which is adapted to mesh with a wheel gear on said output shaft, wherein said input shaft is operatively connected to said motor rotor by a flexible coupling, said flexible coupling having a flexible member, said flexible member transmitting torque between said motor rotor and said input shaft, and wherein said flexible coupling comprises a plurality of radially extending arms defining a plurality of substantially radially extending drive faces, at least one of the drive faces co-operating with at least one radial drive face defined on said rotor and at least one of said drive faces co-operating with drive faces defined on said input shaft.*

*8. An electric power assisted steering system according to claim 7, wherein each of said plurality of radially extending arms is flexible.*

*9. An electric power assisted steering system according to claim 8, wherein each of said plurality of radially extending arms transmits torque between said motor rotor and said input shaft.*

*10. An electric power assisted steering system according to claim 7, wherein said flexible coupling is configured to permit tilting of said input shaft relative to said motor rotor.*

\* \* \* \* \*